United States Patent [19]
Violette et al.

[11] Patent Number: 6,015,264
[45] Date of Patent: Jan. 18, 2000

[54] PRELOADED RETENTION ASSEMBLY FOR AIRCRAFT PROPELLER BLADE RETENTION

[75] Inventors: John A. Violette; Matthew C. Soule, both of Granby; Thomas G. Corley, Suffield, all of Conn.

[73] Assignee: United Technologies Corporation, Windsor Locks, Conn.

[21] Appl. No.: 08/912,082

[22] Filed: Aug. 15, 1997

[51] Int. Cl.[7] .................................................. B64C 11/06
[52] U.S. Cl. ..................... 416/146 A; 416/205; 416/207; 416/209; 416/174; 384/517; 384/540
[58] Field of Search ............................... 416/146 A, 147, 416/174, 205, 207, 208, 209, 220 A; 384/517, 540; 277/511, 512, 525, 534, 541

[56] References Cited

U.S. PATENT DOCUMENTS

| | | |
|---|---|---|
| 4,762,466 | 8/1988 | Bouiller et al. . |
| 4,850,801 | 7/1989 | Valentine . |
| 4,863,352 | 9/1989 | Hauser et al. . |
| 4,921,403 | 5/1990 | Poucher et al. . |
| 5,015,150 | 5/1991 | Rohra . |
| 5,118,256 | 6/1992 | Violette et al. . |
| 5,415,527 | 5/1995 | Godwin . |

FOREIGN PATENT DOCUMENTS

| | | | |
|---|---|---|---|
| 4315080 | 10/1994 | Germany . | |
| 55-96397 | 7/1980 | Japan | 416/207 |
| 2192943 | 1/1988 | United Kingdom | 416/147 |
| 2244525 | 4/1991 | United Kingdom . | |
| 2251896 | 7/1992 | United Kingdom . | |

*Primary Examiner*—Christopher Verdier

[57] ABSTRACT

A propeller blade retention assembly for use with a propeller having a hub rotatable about a propeller axis, is disclosed. The assembly includes a blade receiver for mounting the blade to the hub and an internal surface of a hub arm for interfacing the receiver with the hub. The receiver is positioned in the hub arm and is non-integral with the blade and the hub arm internal surface. A retention mechanism is used for retaining the blade receiver to the hub arm while allowing relative rotatable motion therebetween. A preload device is provided for preloading the retention mechanism prior to centrifugal loading during propeller blade operation. The blade is separable from the blade receiver without disturbing the operability of the retention mechanism.

25 Claims, 3 Drawing Sheets

PRELOADED RETENTION ASSEMBLY FOR AIRCRAFT PROPELLER BLADE RETENTION

TECHNICAL FIELD

This invention relates generally to variable pitch aircraft propeller blades, and more particularly to a preloaded retention assembly therefor.

BACKGROUND ART

Modern designs of aircraft propeller blades use composite materials to produce lightweight blades capable of supporting the operating loads. These operating loads include a centrifugal force component which acts in a direction parallel to the longitudinal axis of the propeller blade. Historically, retention systems of non-preloaded propeller blades rely on the centrifugal load generated by the weight of the blade structure during operation to stiffen the blade retention for load carrying capability, especially the steady and cyclic bending loads. As propeller blades have gotten lighter with the use of composite materials, the retention systems of non-preloaded propeller blades have been altered to provide the necessary load for stiffening of the blade retention. This alteration has resulted in large and heavy parts for retention mechanisms.

Modern propeller blade retention systems can address the problems associated with size and result in weight reduction. Many of these systems will use an assembly of bearings for retention of the propeller blade inside a hub assembly. See for example U.S. Pat. No. 4,921,403 which includes bearing arrangements utilizing roller bearings. Such a bearing arrangement retains the propeller blade from inside the hub and reduces the amount of vibration. However, this design does not provide means for preloading which is required by retention systems that include modern composite blades. There is prior art that addresses the need for preloading. U.S. Pat. No. 4,850,801 discloses a bearing arrangement with means for preloading. However, such an arrangement does not provide ease of replacement and maintenance of parts, since the blade is directly interfaced with the inside of the hub and the retention assembly. Blade replacement would require the removal of bearing parts which further complicates the maintenance process. Furthermore, the cost and complexity of tools necessary to perform routine maintenance increases. Interfacing the propeller blade with the retention parts places limitations on the types of blades that may be used with the system as well as requiring a more complex blade design at the root of the blade.

To address the need for flexibility of interfacing a plurality of propeller blades, some modern applications utilize a receiving means. In such an application the blade is interfaced only with the receiver. The receiver is then interfaced with a retention system. Thus the blade is simplified since it need not be designed for interfacing with the retention system. An example of utilization of a receiving means is shown in U.S. Pat. No. 4,863,352. Unlike the present design this patent utilizes roller bearings in retention and rotation of the propeller blade. Also, the patent, unlike the present invention, accomplishes preload of the system by using an annular fastener threaded onto the hub. While this type of retention mechanism addresses the problems of size and weight of retention mechanisms, it has the inherent limitation of introducing stress concentrations in the threads on the hub, which operates under high cyclic fatigue loading, which can result in hub failure. Similarly, U.S. Pat. No. 4,850,801, discussed above, utilizes a threaded fastener which interfaces with the threaded portion of the hub, thus introducing similar high stress on the hub. The present invention does not include threaded parts on any of the three major parts of the propeller assembly, the hub, the receiver, or the propeller blade.

There exists a need, therefore, for a propeller blade retention system which allows for a coexisting functionally separable blade and retention arrangement and which allows for retention mechanism preloading, yielding a simultaneous reduction in costs, parts, and maintenance complexity.

DISCLOSURE OF THE INVENTION

The primary object of this invention is to provide an assembly for retaining and pre-loading a propeller blade retention, which assembly is entirely functionally separable from the propeller blade reducing part complexity, assembly and maintenance complexity, and maintenance costs.

Another object of this invention is to provide a system for the preloading and retention of a propeller blade that includes a receiver which allows for interfacing a retention assembly and preload system to a plurality of blade types without requiring a complex blade root design.

Still another object of this invention is to provide a system for the retention of and preload application to a propeller blade, which system utilizes a separate receiver and angular contact ball bearings between it and a propeller hub which permit the use of one piece raceways and which doesn't include threads on the hub, blade, or receiver of a propeller assembly.

Yet another object of this invention is to provide a system of blade retention and preloading which utilizes a receiver which accommodates a hydraulic actuator to apply a portion of the preload, permitting the use of smaller, easily handled tools to tighten a preload nut associated with preloading the receiver.

The foregoing objects and advantages set forth herein are achieved by the propeller blade retention assembly of the present invention for use with a propeller having a hub rotatable about a propeller axis. The assembly includes a blade receiver for mounting the blade to the hub and an internal surface of a hub arm for interfacing the receiver with the hub. The receiver is positioned in the hub arm and is non-integral with the blade and the hub arm internal surface. A retention mechanism is used for retaining the blade receiver to the hub arm while allowing relative rotatable motion therebetween. A preload device is provided for preloading the retention mechanism prior to centrifugal loading during propeller blade operation. The blade is separable from the blade receiver without disturbing the operability of the retention mechanism.

The foregoing objects and advantages set forth herein are further achieved by another embodiment of the propeller blade retention assembly of the present invention for use with a propeller having a hub rotatable about a propeller axis. The assembly includes a blade receiver for mounting the blade to the hub and an internal surface of a hub arm for interfacing the receiver with the hub. The receiver is positioned in the hub arm and is integral with the blade and non-integral with the internal surface of the hub arm. A retention mechanism is used for retaining the blade receiver to the hub arm internal surface while allowing relative rotatable motion therebetween. A preload device for preloading the retention mechanism prior to centrifugal loading during propeller blade operation is provided. The retention mechanism includes angular contact ball bearing assemblies for facilitating relative rotational motion between the receiver and the internal surface of the hub arm. The angular contact ball bearing assemblies includes unitary, non-split races.

BEST MODE FOR CARRYING OUT THE INVENTION

Figure 1:
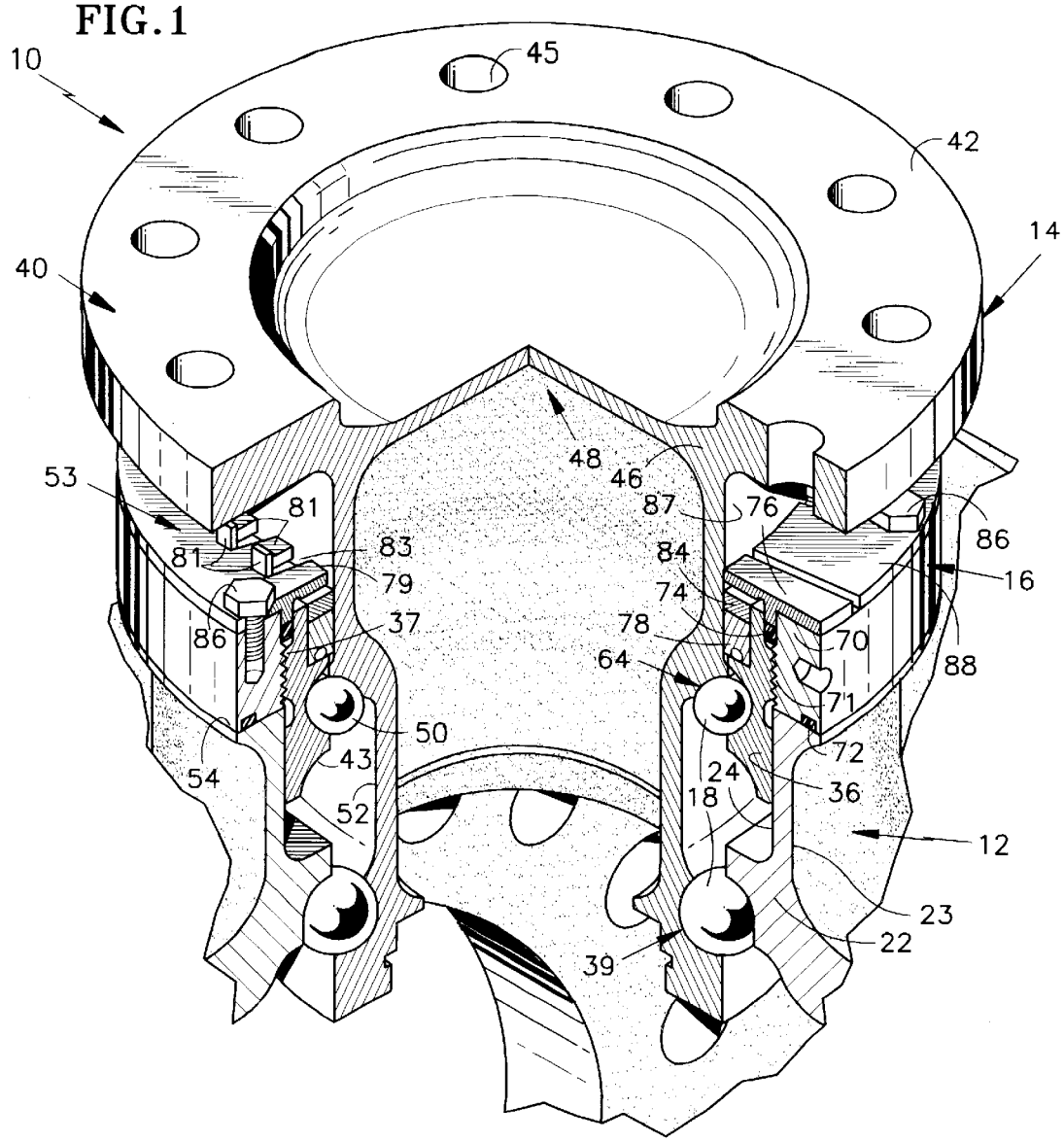
FIG. 1 is a three-dimensional cut-away view of the propeller blade retention assembly including the hub arm, receiver, retention mechanism, and preload mechanism.
Figure 2:
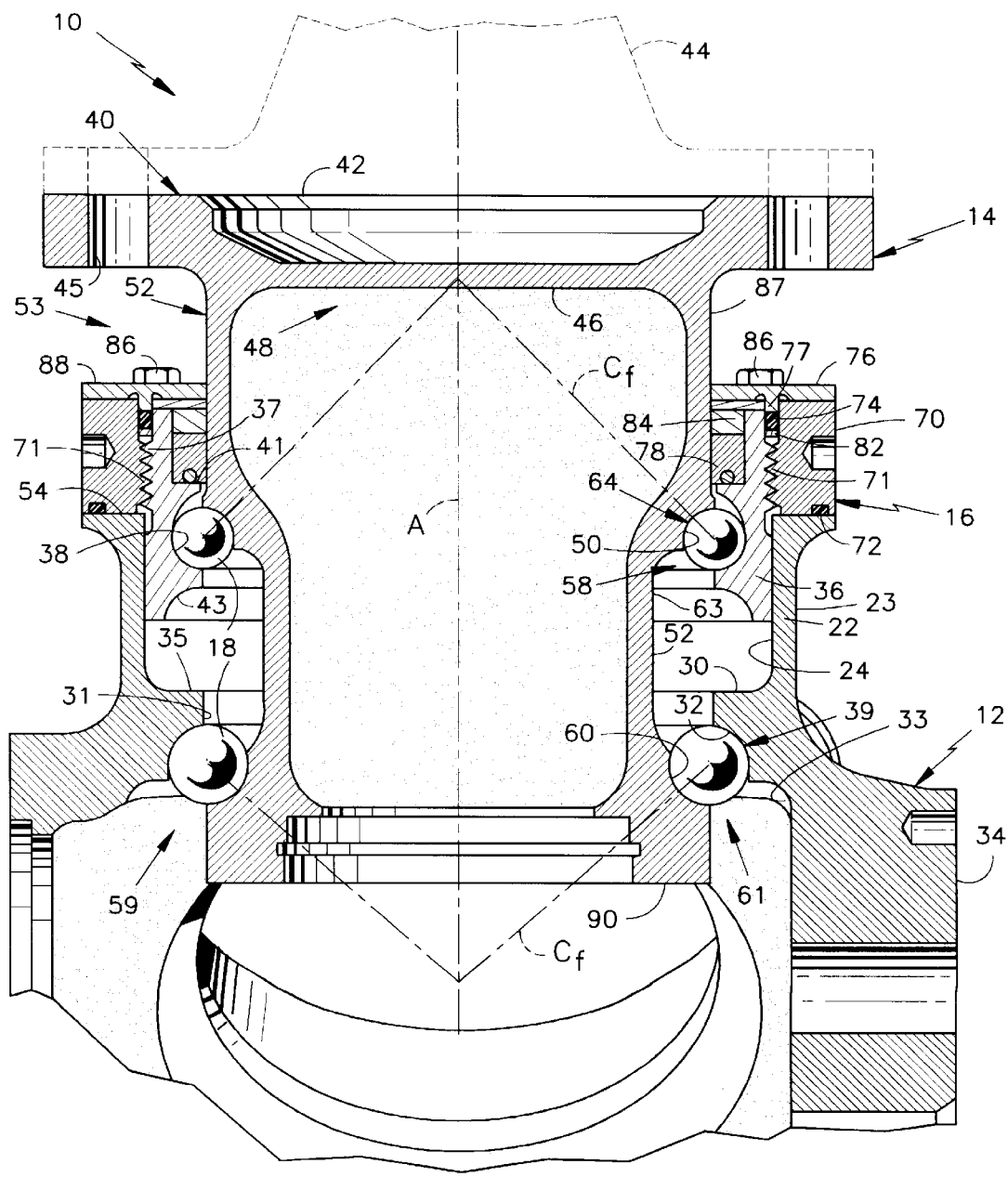
FIG. 2 is a cross-sectional view of the propeller blade retention assembly shown in FIG. 1.

Referring now to the drawings in detail, there shown in FIGS. 1 and 2 the propeller blade retention assembly of the present invention designated generally as 10. The propeller blade retention assembly 10, generally includes four separate parts, a hub 12, a receiver 14, a means for preloading 16, and a means for retention 18. The receiver 14 is positioned within the hub arm 22. The receiver 14 and hub arm 22 are interfaced with the means for preloading 16 and the means for retention 18. The means for retention 18 is positioned between the receiver 14 and the hub arm 22.

The hub arm 22 has a generally cylindrical shape defined by an outer surface 23 and an inner surface 24 extending radially around the axis of rotation of the blade and receiver. The hub arm 22 is generally cylindrical in shape and protrudes from hub barrel 34, as shown in FIG. 2. Still referring to FIG. 2, the inner surface 24 of the hub arm 22 includes a hub arm shelf 30, an inboard, outer first race 32, which has a unitary, non-split construction and an inboard raceway relief area 33, all of which extend circumferentially on inner surface 24. The inboard raceway relief area 33 is radiused or filleted circumferentially around the hub 12 directly adjacent and below the first race 32, and is used to facilitate installation of the inboard ball bearing assembly 39. Nearest the inboard end 61 of hub arm 22 on inner surface 24, a hub arm shelf 30 is formed which includes a first side 35 substantially perpendicular to a second cylindrical side 31, adjacent the first race 32. The hub arm shelf 30 extends circumferentially around the inner surface 24 of hub arm 22 and is utilized to bottom a retention assembly member 36, used to assist preloading, during assembly.

Figure 1A:
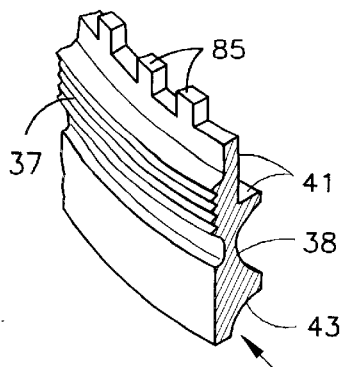
FIG. 1A is an enlarged perspective view of the element designated by arrow 1A in FIG. 1.

The retention assembly member 36, as shown in FIGS. 1, 1A, and 2, is also generally cylindrical in shape, having functionally shaped inner and outer surfaces, including threaded portion 37 on its outer surface and an outboard, outer second bearing race 38, stepped surface 41, for engaging seals, discussed below, and a radiused surface 43, on its middle, top, and bottom inner surfaces, respectively. The upper end of member 36 is defined by a plurality of extensions 85, as shown in FIGS. 1 and 1A, which are discussed in detail below.

With reference to FIG. 2, the receiver 14 has an integrated attachment joint 40 formed at the top end 42 of the receiver 14 for interfacing with a propeller blade 44, whereby the airfoiled blade 44 can be removed from the propeller while on the aircraft without affecting the preload of the blade retention means 18. Attachment joint 40 includes fastener openings 45 for engaging fasteners (not shown) for securing propeller blade 44 thereto. A bulkhead 46 for supporting and strengthening secondary joint 40 with the propeller blade 44 installed, is integrally formed at the bottom side 48 of the secondary joint attachment 40. An outboard, inner third race 50 is radiused or filleted circumferentially about the outer side 52, toward the outboard end 53, of the receiver 14. The third race 50 opposes the second bearing race 38 of the retention assembly member 36, thereby forming outboard raceway 58. An inboard, inner fourth race 60 is radiused or filleted circumferentially about the outer side 52 of the receiver 14 at a distance on the receiver 14, nearest inboard end 61, in which the fourth race 60 forms an opposed side to the first race 32 of the hub arm 22, when installed, whereby inboard raceway 59 is formed. Inboard raceway 59 and outboard raceway 58 are used to seat the inboard, angular contact ball bearing assembly 39, whose installation is facilitated by relief area 33, and an outboard, angular contact ball bearing assembly 64, whose installation is facilitated by a relief area 63, also formed on outer side 52 of receiver 14, adjacent raceway 58, for providing clearance, respectively, for retention of the receiver 14 inside the hub arm 22. The receiver 14 is preferably designed at its base to accommodate the use of a hydraulic or mechanical actuator (not shown) which is used for changing the pitch of the propeller blade 44.

Inboard ball bearing assembly 39 and outboard ball bearing assembly 64 along with inboard raceway 59 and outboard raceway 58, respectively, form an angular contact ball bearing arrangement which, via their angular positioning as indicated by force lines $C_F$, permit the use of unitary, non-split raceways. This eliminates the use of split, load bearing raceways as in the prior art of U.S. Pat. No. 5,415,527. The inboard and outboard ball bearing assemblies, 39 and 64 respectively, allow blade rotation within the hub arm 22. The rolling elements and the raceway geometries are configured for the loads applied by the particular aircraft. The angular orientation of the bearing raceways 58 and 59, and their force line intersections, as indicated by lines $C_f$, allow for a wider "wheelbase" or "cone of contact", similar to as indicated in U.S. Pat. No. 5,118,256, assigned to the assignee hereof, but different than many prior art non-angularly oriented bearings. The centrifugal load, the preload, thrust and torque, as well as bending loads, will react along this "cone of contact" producing a more stable blade retention mechanism. The ball bearing assemblies 39 and 64, respectively, along with the hydraulic actuator (not shown), allow the pitch angle to be changed.

As shown in FIG. 2, the means for preloading 16 includes a ring-shaped preload nut 70 with threads 71 which mate with and engage the threaded portion 37 of the retention assembly member 36. The preload is established by tightening the preload nut 70 against the top surface 54 of hub arm 22, thereby creating a load parallel to the axis of rotation of propeller blade 44. By loading the ball bearing assembly 64 outward through member 36 against the inboard ball bearing assembly 39, restraining inward movement, the preload force is produced. A circumferential static seal 72 is placed between the top surface 54 of the hub arm 22 and the preload nut 70 to prevent leakage of lubricating oil which is contained in the hub arm for both the propeller blade retention mechanism and blade pitch change actuator components. Maximum exposure of lubricating oil on all the interfaced surfaces of the retention components is thereby allowed for maintaining the healthy operation of the components of the propeller blade retention assembly 10. A second circumferential static seal 74, held in place and supported by a preload locking ring 76, is placed between the preload nut 70 and the retention assembly member 36.

The locking ring 76 also supports a dynamic seal 78 as well as preventing the preload nut 70 from backing off the threaded portion 37 of the retention assembly member 36, thereby preventing the loss of preload of the retention means 18. The locking ring 76 has a T-shaped cross-section, as shown in FIG. 1 and 2, and extends circumferentially over preload nut 70, with a leg 77 thereof extending between the preload nut 70 and member 36. The locking ring is preferably split for ease of installation after the preload nut is in place. In the preferred embodiment, the ring 76 includes an interior leg 79 defined by a plurality of fingers 81 separated by slots 83, as shown in FIG. 1. Slots 83, between fingers 81, engage extensions 85 extending from member 36, as shown in FIG. 1A. Bolts 86 are fastened through the top side 88 of the locking ring 76 to hold the locking ring 76 in place, relative to preload nut 70. The engagement of the slots 83 with extensions 85 hold locking ring 76 in place relative to member 36. Accordingly, the dual locking feature of the locking ring 76, i.e. the engagement of the bolts 86 with the preload nut 70 and the slots 83 with the extensions 85, achieves a locked position between preload nut 70 and member 36 at the desired preload position, as defined by the position of preload nut 70 relative threaded portion 37 The split nature and multiple member/preload nut engagement points of locking ring 76 allows its installation at any relative positioning between nut 70 and member 36. As shown in FIG. 1, a spring loaded dynamic seal 78 for maintaining sealing contact pressure between the outer surface 87 of the receiver 14 and stepped surface 41 of the retention assembly member 36, is also provided. A backup ring 82 made of a durable material, and a surface thereof is positioned between the static seal 74 and preload nut 70, functioning as the inboard support of the seal. A second backup ring 84 is placed between the dynamic seal 78 and locking ring 76 to reduce friction and prevent the dynamic seal 78 from dragging on the locking ring 76.

In assembly, and referring to the Figures in general, dynamic seal 78 and backup ring 84 are mounted towards outboard end 53 of outer side 87 of receiver 14. Retention member 36 along with preload nut 70, static seals 72 and 74 and backup ring 82 are slid over receiver 14 part way between inboard race 60 and outboard race 50, such that outboard ball bearing assembly 64 can be inserted against bearing race 38. The outboard ball bearing assembly 64 is inserted into position using relief area 63. Blade receiver 14 and bearing assembly 64 are slid into the hub arm 22 adjacent inner surface 24 thereof. Member 36 is bottomed out on side 35 of shelf 30. Inboard bearing assembly 39 is installed from inside the hub using relief area 33. The assembly as described thus far is pushed outwardly relative hub arm 22. Preload nut 70 is tightened by hand on threaded portion 37 of member 36 to hold the components described in place until subsequent preload application and to tighten up the components with respect to surface 24 of hub arm 22. Preload may be accomplished using preload nut 70 alone or alternatively, the receiver design may be configured with an increased thickness bulkhead 46 to accommodate the use of a hydraulic actuator as assembly tooling to apply a significant portion of the retention preload against surface 48 of bulkhead 46 or base 90 of receiver 14. Using this option permits the use of smaller tools to tighten the preload nut 70 against the hub arm 22. The desired preload is, therefore, applied, by a hydraulic actuator if desired and preload tooling (not shown), using bulkhead 46 or the base 90 of the receiver 14. Preload nut 70 is tightened as desired to complete the preload application. The hydraulic actuator (not shown), if used, is removed. Due to hub deflection, it may be necessary to apply the preload in a stepped manner. The dynamic seal 78 and static seals 72 and 74, and their respective back up rings 84 and 82, as well as locking ring 76 and bolts 86 are then installed to complete the assembly.

In operation, the inner and outer ball bearing assemblies, 39 and 64 respectively, allow blade rotation within the hub arm 22 which controls pitch and therefore propeller RPM. As the pitch is changed by a hydraulic actuator, which actuator is not shown and is not the same as the actuator used for applying preload, the ball bearing assemblies, 39 and 64, can rotate circumferentially around hub arm 22.

Figure 3:
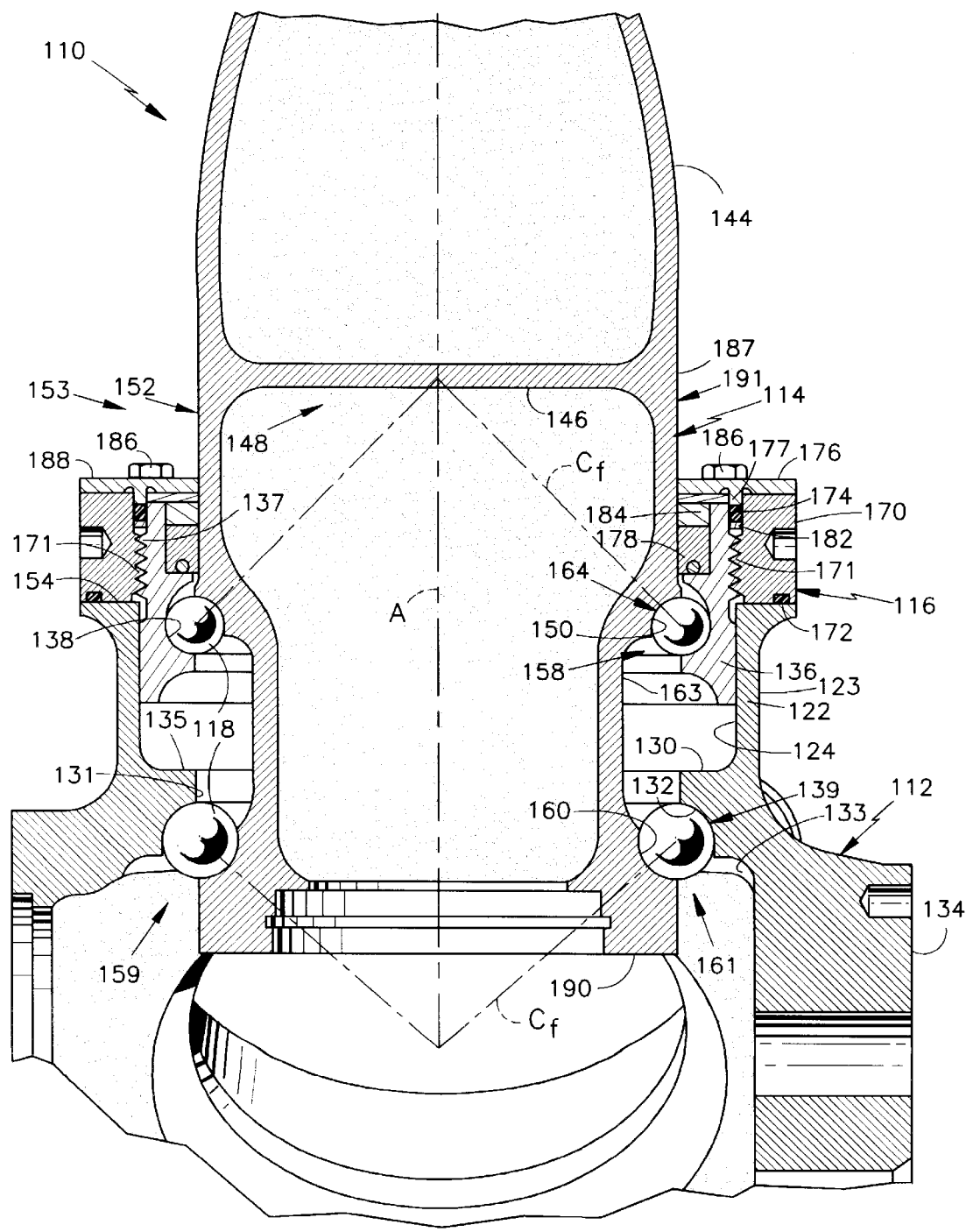
FIG. 3 is a cross-sectional view of another embodiment of the propeller blade retention assembly.

In another embodiment 110 of this invention, as shown in FIG. 3, the receiver 114 may be integrally formed, as the root 191 of propeller blade 144, including, but not redescribed herein, all of the other features of this invention as discussed and defined above, as indicated by the use of similar number designations on the drawings. Additional features specifically designated in FIGS. 1 and 2, shown but not designated in FIG. 3, are also a part of embodiment 110 and are not redescribed herein. The blade is integrally formed to receiver 114 in the process of forming the blade, as is known in the art. As above, unitary, non-split races 132, 138, 150 and 160, are used which, unlike the prior art, prevent raceway deterioration. Also, angular contact ball bearing assemblies are used.

The primary advantage of this invention is that the parts of the assembly are entirely functionally separable from the propeller blade which reduces the complexity of parts and tools. This reduction in complexity ultimately results in a decrease in costs. Another advantage of this invention is that the system for the preloading and retention of a propeller blade includes a receiver which allows for interfacing the retention assembly and preload system to a plurality of blade types without requiring a complex blade root design. Still another advantage of this invention is that it utilizes a separate receiver and angular contact ball bearings between the retention assembly and preload system and a propeller hub which permit the use of one piece raceways thus avoiding the potential problems associated at the joints of split raceways and which doesn't include threads on the hub, blade, or receiver of a propeller assembly. Yet another advantage of this invention is that it utilizes a receiver which can accommodate a hydraulic actuator to apply a portion of the preload, permitting the use of smaller, easily handled tools to tighten a preload nut associated with preloading the receiver.

Although the invention has been shown and described with respect to a best mode embodiment thereof, it should be understood by those skilled in the art that the foregoing and other changes, omissions, and additions in the form and detail thereof may be made without departing from the spirit and scope of the invention.

What is claimed is:

1. A propeller blade retention assembly for use with a propeller having a hub rotatable about a propeller axis, said hub defining a cavity containing a lubricating fluid, said propeller blade retention assembly comprising:

a receiving means for mounting the blade to the hub;

means for interfacing said receiving means with the hub, wherein said receiving means is positioned in said means for interfacing and is non-integral with the blade and said means for interfacing;

a retention means being for retaining said receiving means to said means for interfacing wherein said wherein said receiving means and said means for interfacing define an inboard and outboard relief area for facilitating assembly of said retention means and, wherein said retention means comprises:

an outboard ball bearing assembly including outboard rolling elements;

an inboard ball bearing assembly including inboard rolling elements for allowing relative rotational motion between said receiving means and said means for interfacing, a member having an outboard race defining a portion of said outboard ball bearing assembly and threads; and means for preloading said retention means prior to centrifugal loading during propeller blade operation, wherein said blade is separable from said receiving means without disturbing the operability of said retention means;

wherein said means for preloading comprises a preload nut for engagement with said threads, and wherein said member is capable of generating a retention preload when said outboard race and said rolling outboard elements are loaded against said inboard ball bearing assembly by engaging said means for preloading with said threads, and wherein said retention means further comprises a first static seal positioned between said member and said preload nut; and, a second static seal between said preload nut and said means for interfacing for substantially sealing the cavity.

2. The propeller blade retention assembly according to claim 1, wherein the hub comprises a hub barrel and said means for interfacing comprises a hub arm connected to the hub barrel, wherein said hub arm and said receiving means are interfaced using said retention means.

3. The propeller blade retention assembly according to claim 2, wherein said hub arm further comprises a hub arm cavity with means for supporting said retention means.

4. The propeller blade retention assembly according to claim 2, wherein said threads extend outside said means for interfacing, and wherein said preload nut is located above and adjacent to said hub arm and the preload is established by tightening said preload nut on said threads against said hub arm and tensioning said retention means.

5. The propeller blade retention assembly according to claim 1, wherein said receiving means comprises an attachment joint whereby the blade is attachable to and detachable from said receiving means.

6. The propeller blade retention assembly according to claim 4, wherein said receiving means further comprises a blade receiver bulkhead for providing support to said blade receiving means.

7. The propeller blade retention assembly according to claim 5, wherein said receiving means further comprises a receiving base with means for engaging a blade pitch change actuator.

8. The propeller blade retention assembly according to claim 1, wherein said retention means further comprises an inboard and an outboard angular contact ball bearing raceway formed between said receiving means and said member and between said receiving means and said means for interfacing, wherein each of said inboard and outboard raceways are formed from unitary non-split races.

9. The propeller blade retention assembly according to claim 8, wherein said inboard and outboard rolling elements comprise angular contact ball bearings for engagement with said inboard and outboard raceways for permitting blade rotation of the blade within said hub arm.

10. The propeller blade retention assembly according to claim 1, wherein said retention means further comprises a dynamic seal located between said receiving means and said member.

11. The propeller blade retention assembly according to claim 10, wherein said retention means further comprises means for preventing damage to said dynamic seal.

12. The propeller blade retention assembly according to claim 1, further comprising a locking means for locking a desired rotational position between said preload nut and said threads.

13. The propeller blade retention assembly according to claim 12, wherein said means for preloading further comprises a retaining device whereby said locking means is held in place against said preload nut and threads.

14. The propeller blade retention assembly according to claim 1, wherein said receiving means includes a main body portion having an inside end and an outside end, said inside end positioned in the hub and said outside end positioned outside the hub, said outside end including means for engaging the blade without the blade entering the hub, said means for preloading being located between said inside and outside end, inward of said means for engaging, such that upon installation and removal of the blade said preloading is undisturbed.

15. A propeller blade retention assembly for use with a propeller having a hub rotatable about a propeller axis, said hub defining a cavity containing a lubricating fluid, said propeller blade retention assembly comprising:

a receiving means for mounting the blade to the hub;

means for interfacing said receiving means with the hub, wherein said receiving means is positioned in said means for interfacing and is integral with the blade and non-integral with said means for interfacing and wherein said receiving means and said means for interfacing define an inboard and outboard relief area for facilitating assembly of said retention means;

a retention means for retaining said receiving means to said means for interfacing, said retention means comprising:

angular contact ball bearing assemblies for facilitating relative rotational motion between said receiving means and said means for interfacing, wherein said angular contact ball bearing assemblies include unitary, non-split races, wherein said angular contact ball bearing assemblies include an outboard ball bearing assembly including outboard rolling elements and an inboard ball bearing assembly including inboard rolling elements; and a member having a unitary outboard, non-split race defining a portion of said outboard ball bearing assembly and threads; and means for preloading said retention means prior to centrifugal loading during propeller blade operation, wherein said means for preloading comprises a preload nut for engagement with said threads, and wherein said member is capable of generating a retention preload when said outboard race and said outboard rolling elements are loaded against said inboard ball bearing assembly by engaging said means for preloading with said threads, said retention means further comprising at least two static seals positioned between said member and said preload nut and between said preload nut and said means for interfacing for sealing the cavity.

16. The propeller blade retention assembly according to claim 15, wherein the hub comprises a hub barrel and said means for interfacing comprises a hub arm connected to the hub barrel, wherein said hub arm and said receiving means are interfaced using said retention means.

17. The propeller blade retention assembly according to claim 16, wherein said hub arm further comprises a hub arm cavity with means for supporting said retention means.

18. The propeller blade retention assembly according to claim 17, wherein said receiving means fits inside said hub arm cavity and includes a bulkhead for strengthening said receiving means.

19. The propeller blade retention assembly according to claim 18, wherein said receiving means further comprises a receiving base with means for engaging a blade pitch change actuator.

20. The propeller blade retention assembly according to claim 16, wherein said threads extend from said member to a position outside of said means for interfacing, and wherein said preload nut is located above and adjacent to said hub arm and the preload is established by tightening said preload nut on said threads against said hub arm and tensioning said retention means.

21. The propeller blade retention assembly according to claim 16, wherein said threads extend from said retention means to a position outside of said means for interfacing, wherein said preloading is achieved by engaging said nut with said threads and against said hub arm.

22. The propeller blade retention assembly according to claim 15, wherein said retention means further comprises an inboard and an outboard angular contact, non-split, unitary raceway formed between said receiving means and said member and between said receiving means and said means for interfacing.

23. The propeller blade retention assembly according to claim 15, further comprising a locking means for locking a desired rotational position between said preload nut and threads.

24. The propeller blade retention assembly according to claim 15, wherein said means for preloading further comprises a retaining bolt whereby said locking means is held in place against said preload nut and threads.

25. The propeller blade retention assembly according to claim 15 wherein said retention means further comprises a dynamic seal located between said receiving means and said member.

* * * * *